April 12, 1949.  S. DOBA, JR  2,466,879
SLANT RANGE COMPUTING CIRCUIT
Filed March 21, 1944
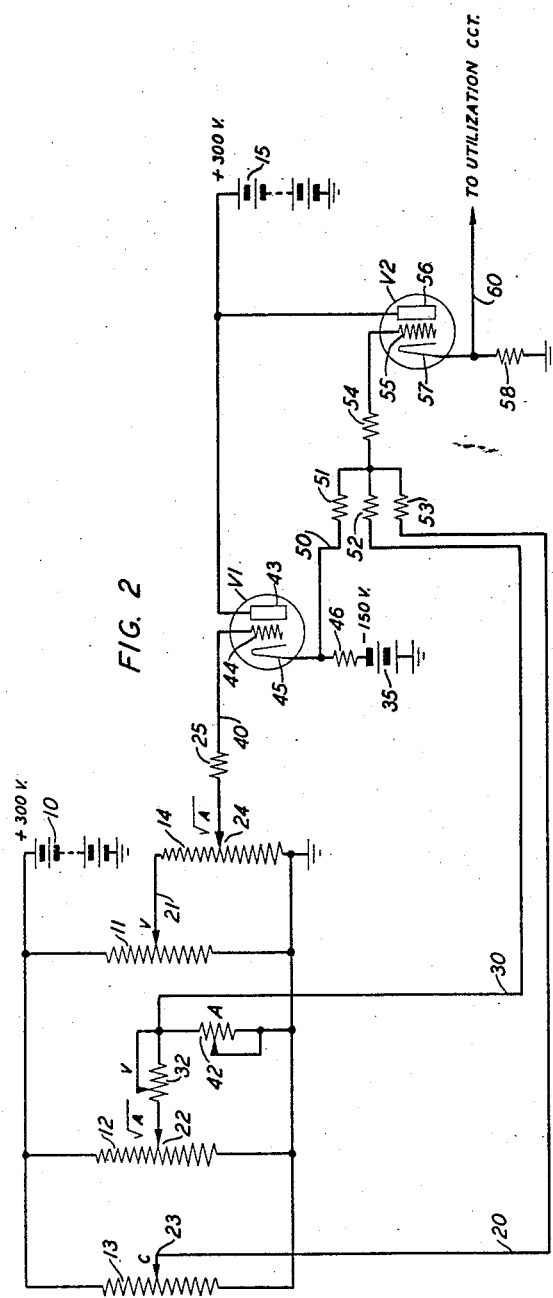
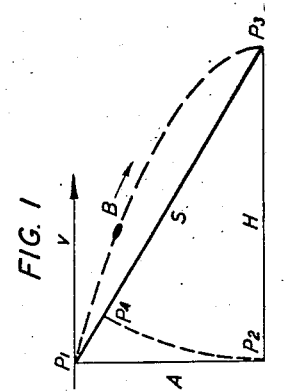
FIG. 1
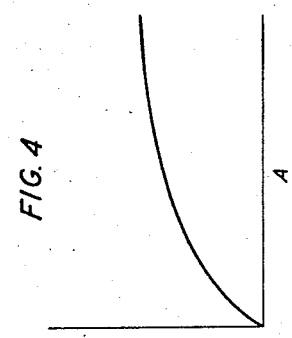
FIG. 4
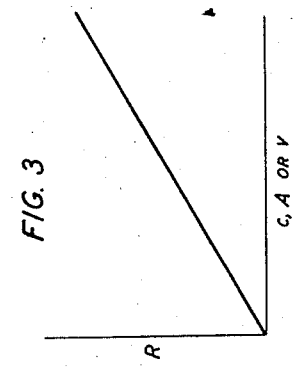
FIG. 3
INVENTOR
S. DOBA, JR.
BY D. MacKenzie
AGENT Patented Apr. 12, 1949

2,466,879

UNITED STATES PATENT OFFICE 2,466,879

SLANT RANGE COMPUTING CIRCUIT

Stephen Doba, Jr., Long Island City, N. Y., assignor to Bell Telephone Laboratories, Incorporated, New York, N. Y., a corporation of New York Application March 21, 1944, Serial No. 527,461

2 Claims. (Cl. 235—61.5)

This invention relates to an improved method and means for computing the chord of the path described by a body having a known initial horizontal velocity and falling through a known height. A particular application of the invention is to compute the slant range at which bombs are to be released from an attacking plane traveling at a known altitude and speed to strike a target on the surface to which the altitude is referred.

The general object of the invention is therefore to facilitate the computation of the straight line distance between the point of release of a falling body and the point at which the body strikes a surface below.

Inasmuch as in bombing an enemy target from an airplane it is important to release the bombs from a point at the proper distance in front of the target, another object of the invention is to facilitate the control of aerial bombing. In such bombing the effect of air resistance varies with the shape and size of the bomb and the invention includes means for making allowance for this effect. To provide such means is a third object of the invention.

These objects are accomplished by a simple electrical circuit composed of easily obtainable elements as will be apparent from the following description read with reference to the accompanying drawing, in which:

Fig. 1 shows the geometrical relationships made use of;

Fig. 2 is a diagram of a preferred circuit of the invention; and

Figs. 3 and 4 are graphs from which may be understood the construction of certain potentiometers used in the circuit of Fig. 2.

Referring first to Fig. 1, consider a body B initially travelling at a horizontal velocity $v$ and released from point $P_1$ above the surface $P_2P_3$. Call this altitude, $P_1P_2$, A. Neglecting air resistance, the time of fall $$t = \sqrt{\frac{2A}{g}}$$

where $g$ is the acceleration due to gravity, and the horizontal distance H traveled by B during this time of fall is $$H = vt = v\sqrt{\frac{2A}{g}}$$

If it is desired to release the body from altitude A to strike at point $P_3$ this release must occur directly over point $P_2$ where $P_2P_3 = vt$. In Fig. 1 the actual fall of the body B is along the dashed parabola $P_1$ to $P_3$ while the slant range from the point of release to the point of impact is the straight line $P_1P_3$. The proportions of the triangle $P_1P_2P_3$ in Fig. 1 are those of the case where the attacking plane is traveling at approximately 170 miles an hour at an altitude of 1500 feet. H is then 2400 feet and the slant range S is 2830 feet, approximately. In Fig. 1, $P_2P_3 = H$, $P_1P_3 = S$, and $P_1P_4 = S - H$.

Given means for measuring the altitude and the ground speed of the airplane, it is possible to represent these quantities by electrical voltages and resistances. Such measuring means will be assumed herein. The altitude is obtained from any suitable altimeter and the ground speed from any known air speed meter. For the sake of simplicity it will be here assumed that there is no wind and that the target is stationary at $P_3$. Any suitable range finder may be used to determine the range from airplanes to target at any instant and the range $P_1P_3$ at which bombs should be released is represented by the apparatus of the present invention as an electrical voltage.

If $$H = v\sqrt{\frac{2A}{g}}, \text{ then } S = \sqrt{A^2 + H^2} = \sqrt{A^2 + \frac{2v^2A}{g}}$$

It is difficult to establish a voltage representing this expression for S, while it is quite simple to represent by voltages both altitude and ground speed. S may be decomposed into two components, H and S−H, and these may be represented by voltages which are summed to yield a voltage representative of S. So decomposing S we find $$S - H = \sqrt{A^2 + \frac{2v^2A}{g}} - v\sqrt{\frac{2A}{g}}$$

This expression, apparently intractable to an electrical circuit, can be approximated by:

$$S - H = K\frac{A^{3/2}}{v + A^{1/2}}$$

where A and S−H are in feet and $v$ is in miles per hour.

As a numerical example the situation of Fig. 1 corresponds to A=1500 feet, v=170 miles per hour, S=2840 feet, S—H=430 feet; if K=154, S—H computed from the formula is 430 feet. For A=144 feet and v=400 miles per hour, S—H=6 feet actually, and 6.5 feet from the formula above with K=1.54. For A=1600 feet and v=100 miles per hour, S—H=703 feet actually, 704 feet computed. The simplified expression for S—H is thus only negligibly in error over a wide range of speeds and altitudes.

Referring now to Fig. 2, battery 10 supplies 300 volts across potentiometers 11, 12 and 13. Potentiometers 11 and 13 are linear and respectively of resistances approximately 10,000 and 20,000 ohms. These potentiometers are swept by wipers 21 and 23 respectively, and the resistance between ground and either of wipers 21 and 23 is proportional, as shown in Fig. 3, to the wiper's distance from the grounded end of the potentiometer. Potentiometer 12, traversed by wiper 22, is so wound that the resistance between ground and the position of wiper 22 is as shown in Fig. 4, viz., proportional to the square root of the distance of wiper 22 from the grounded end of potentiometer 12. Wiper 21 is connected to ground through potentiometer 14, suitably of resistance 125,000 ohms, wound similarly to potentiometer 12 and traversed by wiper 24. On graduated scales, not shown, are read the positions of wipers 21 to 24 inclusive. Wiper 22 is connected to ground through resistances 32 and 42 in series. Each of these resistances is variable, as shown in Fig. 2, and of maximum resistances preferably about 100,000 ohms and 10,000 ohms respectively.

Potentiometer 11 is tapped by wiper 21 to derive a voltage proportional to the ground speed of the airplane and this voltage is impressed across potentiometer 14 which is tapped by wiper 24 proportionately to the square root of the altitude. The voltage thus derived by wiper 24 is proportional to the speed times the quare root of the altitude and so to H. Potentiometer 12 is tapped by wiper 22 to include a resistance to ground proportional to the square root of the altitude, while the resistances of resistors 32 and 42 are adjusted to be proportional to ground speed v and to altitude A respectively. By simple computation it may be shown that there then appears between ground and the junction of resistors 32 and 42 a voltage proportional to $$\frac{A^{3/2}}{v+A^{1/2}}$$

or S—H, the factor K being allowed for in the summation circuit later described. This may be shown by considering the total resistance of potentiometer 12 as unity, of which a part $1-\sqrt{A}$ is included between the positive terminal of battery 10 and wiper 22, while a part $\sqrt{A}$ is between wiper 22 and ground. The latter part of the potentiometer 12 is in parallel with resistors 32 and 42 in series, which are respectively proportional to v and A. The resistance of the parallel paths from wiper 22 to ground is therefore $$\frac{(v+A)\sqrt{A}}{v+A+\sqrt{A}}$$

and this is in series with the resistance $1-\sqrt{A}$.

Accordingly, the voltage to ground at wiper 22 is (if E is the voltage of battery 10) equal to $$E\frac{(v+A)\sqrt{A}}{v+\sqrt{A}}$$

and this voltage is that across the voltage divider R32R42. The voltage of ground of the junction of resistors 32 and 42 is then $$E\frac{(v+A)\sqrt{A}}{v+\sqrt{A}} \cdot \frac{A}{v+A}, \text{ or } E\frac{A^{3/2}}{v+A^{1/2}}$$

The relative resistance values of 12, 32 and 42 determine the satisfaction of the equation where v is in miles per hour and A in feet. Potentiometer 13 is tapped by wiper 23 to provide a correction voltage if such is for some reason desired, for example, to allow for the effect of air resistance or for a desired advance of the moment of bomb release.

Conductors 20, 30 and 40, connected respectively to wiper 23, to the junction of resistors 32 and 42, and through resistors 25 of about 50,000 ohms resistance to wiper 24, serve to apply to a summation circuit the three voltages of which the sum represents the slant range P₁P₃ of Fig. 1 corrected as required. The correction voltage from wiper 23 over conductor 20 is, of course, small and is empirically determined. The voltage over conductor 30 from the junction of resistors 32 and 42 represents S—H. In actual practice it has been found convenient to isolate the comparatively large voltage representing H, taken over conductor 40 from wiper 24, from the voltages with which it is combined, and this isolation is effected by means of vacuum tube V₁, a triode which may be one-half of a 6SL7. Battery 15, which may be identical with battery 10, supplies anode voltage to anode 43 of tube V₁. Conductor 40 impresses the voltage H on grid 44 of V₁ of which cathode 45 is biased negatively to ground by battery 35, conveniently 150 volts, through cathode load resistor 46 of which the resistance is about one-third megohm. Grid 44 is grounded through resistor 25 and a portion of potentiometer 14. Across load resistor 46 appears a voltage representative of H and this voltage, adjusted in scale to allow for the factor K in the formula for S—H, is transferred to a summing circuit.

Conductors 20, 30 and 50 are connected respectively to one-quarter megohm resistances 51, 52 and 53, the remote ends of which are joined together and their junction through one-tenth megohm resistor 54 is connected to grid 55 of vacuum tube V₂. Tube V₂ is suitably a triode, for example, one-half of a 6SN7-GT. Anode 56 of tube V₂ is supplied from battery 15 while cathode 57 is grounded through one-tenth megohm resistor 58. Cathodes 45 and 57 are heated by conventional means, not shown. It may be shown by analysis that with the described connections of conductors 20, 30 and 50 to the grid of tube V₂, the voltage appearing across resistor 58 in the cathode circuit of that tube is proportional to the sum of the three voltages supplied to grid 55 through the respective resistors 51, 52 and 53. It will be recognized that the described circuit of tube V₂ is that of a cathode follower, so that the voltage at cathode 57 closely follows that of grid 55. Resistor 54 serves to limit grid current in tube V₂ if grid 55 is driven positive by the voltage at the junction of resistors 51, 52 and 53, and the relation of the voltage at this junction to the voltages on conductors 20, 30 and 50 is ascertained by applying Kirchhoff's laws to the participating circuits.

Let the voltages on conductors 20, 30 and 50 be denoted by $E_1$, $E_2$ and $E_3$, respectively, and let it be assumed that through resistor 53 a current $i_1$ flows toward the junction of resistors 51, 52 and 53. Let $i_2$ and $i_3$ be currents flowing away from that junction through resistors 52, 51, respectively. Call the resistance of resistors 51, 52 and 53 each R and note that the polarities of voltages $E_1$, $E_2$ and $E_3$ are all positive toward the junction of the three resistors. Then:

$$i_1 = i_2 + i_3 \quad (1)$$
$$E_1 - i_1 R - i_3 R - E_3 = 0 \quad (2)$$
$$E_1 - i_1 R - i_2 R - E_2 = 0 \quad (3)$$

Combining terms, $$E_1 - (i_1 + i_3)R - E_3 = E_1 - (i_2 + 2i_3)R - E_3 = 0 \quad (2')$$
$$E_1 - (i_1 + i_2)R - E_2 = E_1 - (2i_2 + i_3)R - E_2 = 0 \quad (3')$$

From (3') $i_3 R = E_1 - 2i_2 R - E_2 \quad (3'')$

Substituting in (2')

$$E_1 - i_2 R - 2(E_1 - 2i_2 R - E_2) - E_3 = 0 \quad (2'')$$

or $$E_1 - 2E_1 - E_3 - i_2 R + 4 i_2 R + 2 E_2 = 0$$

or $$-E_1 + 3 i_2 R + 2 E_2 - E_3 = 0$$

and $$i_2 R = \frac{E_1 - 2E_2 + E_3}{3} \quad (4)$$

Now, the voltage at the common point of resistors 51, 52, 53 is $$E_g = E_2 + i_2 R \quad (5)$$

(bearing in mind that $i_2$ has been counted positive away from the common point)

Finally, from (4)

$$E_g = E_2 + \frac{E_1 - 2E_2 + E_3}{3} = \frac{E_1 + E_2 + E_3}{3} \quad (6)$$

The analysis above given applies accurately in the situation shown in Fig. 2, where there is no current path to ground from the junction of resistors 51, 52 and 53. Accordingly, by conductor 60 the summation voltage representing the slant range $P_1 P_3$ of Fig. 1 with any necessary correction from potentiometer 13 may be taken to a utilization circuit of any desired character.

In the apparatus of Fig. 2, potentiometers 12 and 14 and resistor 42 involve only the altitude and wipers 22 and 24 may be ganged together with the adjustment of resistor 42 and simultaneously set for the known altitude. Likewise, wiper 21 of potentiometer 11 may be ganged with the adjustment of resistor 32 in a single setting for ground speed. Altitude and ground speed scales may be located as desired, for example, in association with potentiometers 14 and 11 respectively.

It will be apparent that the apparatus of Fig. 2 provides an arrangement of easily obtainable electrical parts adapted to the purpose of the invention, viz., to produce a voltage representing the slant range from a target at which an attacking plane must release the bomb intended to strike that target. The method of the present invention involves the steps of producing a first voltage representing the horizontal component of the trajectory of such a bomb, producing a second voltage representing the difference between the chord of that trajectory and its horizontal component and summing these voltages, thereby producing a summation voltage representing the chord.

It is obvious that the method just described may be employed using other apparatus than that specifically described in connection with Fig. 2.

What is claimed is:

1. For bombing a selected point from an airplane flying thereover at a known altitude A and at a known ground speed $v$, a system of apparatus for providing a voltage approximately proportional to the slant range, with a desired correction, from the airplane to the point appropriate to release a bomb, comprising: a source of voltage of which one terminal is grounded, a first, a second and a third potentiometer shunting the source, the windings of the first and third potentiometers having each a constant resistance per turn while the winding of the second potentiometer has a resistance per turn inversely proportional to the square root of the distance from the grounded end; a first brush adjusted to select from the first potentiometer a voltage to ground proportional to $v$, a fourth potentiometer connected between the first brush and ground having a winding of resistance per turn inversely proportional to the square root of the distance from the grounded end, a second brush adjusted to select from the fourth potentiometer a fractional voltage proportional to $A^{1/2}$ thereby providing a voltage to ground proportional to $v A^{1/2}$; a third brush adjusted to select from the second potentiometer a voltage proportional to $A^{1/2}$, a first and second adjustable resistance connected in series between ground and the third brush, said resistances being adjusted to be proportional to $v$ and to A, respectively, whereby the voltage to ground at the junction of said resistances is proportional to $A^{3/2}$ divided by $v + A^{1/2}$; a fourth brush adjusted to select from the third potentiometer a correcting voltage; means including a first thermionic vacuum tube for adjusting the voltage from the second brush to the same scale factor as the voltage at the junction of the resistances; and means including a second thermionic vacuum tube for summing the adjusted voltage from the second brush, the voltage at the junction of the resistors and the correcting voltage to provide a final voltage to ground approximately proportional to the appropriate slant range with the correction desired.

2. For bombing a selected point from an airplane flying thereover at a known altitude A and at a known ground speed $v$, a system of apparatus for providing a voltage approximately proportional to the slant range from the airplane to the point appropriate to release a bomb comprising: a source of voltage of which one terminal is grounded, a first and a second potentiometer shunting the source, the winding of the first potentiometer having a constant resistance per turn while the winding of the second potentiometer has a resistance per turn inversely proportional to the square root of the distance from the grounded end; a first brush adjusted to select from the first potentiometer a voltage to ground proportional to $v$, a third potentiometer connected between the first brush and ground having a winding of resistance per turn inversely proportional to the square root of the distance from the grounded end, a second brush adjusted to select from the third potentiometer a fractional voltage proportional to $A^{1/2}$ thereby providing a voltage to ground proportional to $vA^{1/2}$; a third brush adjusted to select from the second potentiometer a voltage proportional to $A^{1/2}$, a first and a second adjustable resistance connected in series between ground and the third brush, said resistances being adjusted to be proportional to $v$ and to $A$, respectively, whereby the voltage to ground at the junction of the resistances is proportional to $A^{3/2}$ divided by $v+A^{1/2}$; means including a first thermionic vacuum tube for adjusting the voltage from the second brush to the same scale factor as the voltage at the junction of the resistances; and means including a second thermionic vacuum tube for summing the adjusted voltage from the second brush and the voltage at the junction of the resistors to provide a final voltage to ground approximately proportional to the appropriate slant range.

STEPHEN DOBA, JR.

REFERENCES CITED

The following references are of record in the file of this patent:

UNITED STATES PATENTS

| Number | Name | Date |
| --- | --- | --- |
| 2,114,330 | Borden | Apr. 19, 1938 |
| 2,212,799 | Sperry | Aug. 27, 1940 |
| 2,244,369 | Martin | June 3, 1941 |
| 2,277,285 | Woodling | Mar. 24, 1942 |
| 2,399,726 | Doyle et al. | May 7, 1946 |
| 2,401,779 | Swartzel | June 11, 1946 |
| 2,408,081 | Lovell et al. | Sept. 24, 1946 |
| 2,426,658 | Wooldridge | Sept. 2, 1947 |
| 2,427,463 | Klemperer et al. | Sept. 16, 1947 |

FOREIGN PATENTS

| Number | Country | Date |
| --- | --- | --- |
| 164,765 | Great Britain | June 23, 1921 |
| 458,274 | Great Britain | Dec. 16, 1936 |
| 848,330 | France | July 24, 1939 |